J. H. HOLMGREEN & W. H. UNDERWOOD.
AIR LIFT PUMP.
APPLICATION FILED OCT. 17, 1911.
1,033,895.
Patented July 30, 1912.
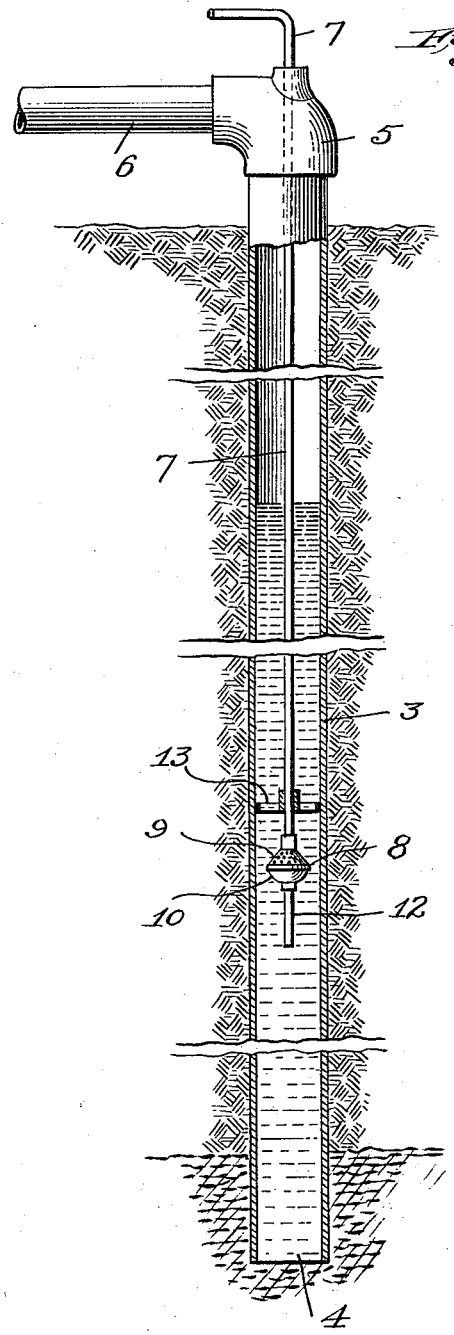
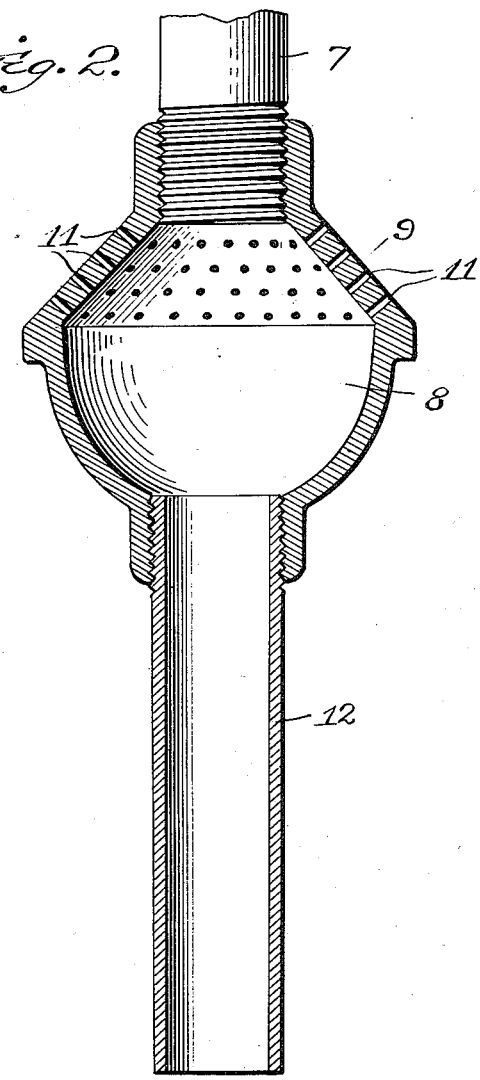

UNITED STATES PATENT OFFICE.

JULIUS H. HOLMGREEN AND WILLIAM H. UNDERWOOD, OF SAN ANTONIO, TEXAS.

AIR-LIFT PUMP.

1,033,895.   Specification of Letters Patent.   Patented July 30, 1912.

Application filed October 17, 1911. Serial No. 655,188.

*To all whom it may concern:*

Be it known that we, JULIUS H. HOLMGREEN and WILLIAM H. UNDERWOOD, citizens of the United States, and residents of San Antonio, in the county of Bexar and State of Texas, have invented certain new and useful Improvements in Air-Lift Pumps, of which the following is a specification.

In air-lift pumps a tube is driven into the earth until it penetrates the water-bearing stratum sufficiently for the water to rise to a considerable height in the tube. This tube ordinarily not only forms the casing of the well, but also forms the discharge pipe for conducting the water above the surface of the ground. In some instances the casing is separate from the discharge pipe, being of greater diameter and placed outside of the discharge pipe with an annular space between the two. The lower end of the discharge pipe is open so that the surrounding water can freely enter the pipe. In the discharge pipe near its lower end is placed an atomizer communicating with an air-supply pipe leading from a source of compressed air above the ground. Where the discharge pipe forms the casing of the well the air-pipe, of much less diameter, passes downwardly through the discharge pipe. Where there is a casing outside of the discharge pipe the air-pipe may pass down through the annular space between the casing and the discharge pipe. Air under pressure passes from the atomizer and commingles with the surrounding water in the discharge pipe, thereby forming an aerated column of water in the discharge pipe that has less specific gravity than the solid water outside of the discharge pipe. Consequently if the natural level of the water is sufficiently near the surface of the ground and the volume and pressure of air sufficiently great the mixture of air and water will flow from the upper end of the discharge pipe.

The present invention relates particularly to improvements in the atomizer for introducing the air into the water in the lower end of the discharge pipe.

It has for its object the provision of a device whereby the air is finely divided into jets that are introduced into the water in upward and outward directions. By directing the air upwardly in the discharge pipe the pressure exerted has a tendency to overcome the inertia of the water to start the upward movement; by directing the air outwardly a thorough aeration is insured of the adjacent column of water in the discharge pipe; and by injecting the air in fine streams a thorough commingling of the water and air is secured and the formation of large bubbles is prevented. The formation of large bubbles indicates that there is incomplete aeration of the water, or that the air is injected at too high a pressure or in too great a volume. In practice, to obtain the best economical results, it has been found that the volume and pressure of the air injected should be sufficient to aerate thoroughly the water, and no more, so that the flow will be produced by the difference between the specific gravity of the solid water outside of the discharge pipe and the specific gravity of the aerated water within the discharge pipe.

The invention consists in the novel construction, combination and arrangement of parts, hereinafter described, pointed out in the appended claims, and illustrated in the accompanying drawings.

In the drawings, in which similar reference characters designate corresponding parts, Figure 1 is a vertical sectional view, broken away in parts, of an air-lift pump embodying the invention. Fig. 2 is an enlarged detail vertical sectional view of the atomizer.

The discharge pipe 3, which in this instance also forms the casing of the well, is driven into the earth until its lower end penetrates the water-bearing stratum. The lower end of the pipe, as at 4, is open so that the surrounding water can enter the pipe. The upper end of the discharge pipe is provided with a cap 5 from which leads the eduction pipe 6. Through the cap passes the air-supply pipe 7 communicating with a suitable source of air-pressure and leading through the discharge pipe to a point near the bottom of the latter. On the lower end of the air-supply pipe is the atomizer 8. The distance to which the atomizer is submerged depends upon the depth of the well, the distance of the natural level of the water below the surface of the ground, and the supply of water in the water-bearing stratum. Under ordinary conditions the atomizer is submerged below the natural level of the water a distance double that between the level of the water and the surface of the ground. For an instance, should the well be driven to a depth of 165 feet into ordinary water-bearing stratum and the natural level of the water should stand within 50 feet of the surface of the ground, then the atomizer would be submerged 100 feet, or within 15 feet of the lower end of the discharge pipe. However, as the conditions vary in each particular well the relative disposition of the parts will be made to meet the requirements.

The atomizer 8 comprises a shell somewhat approaching a globular form, the top 9 being conical and the bottom 10 hemispherical. At the upper end the shell is screwed onto the lower end of the air-supply pipe 7, which communicates with the interior of the shell. Passing through the wall of the conical top are numerous small passages 11 leading from the interior of the shell to the exterior of the same. These passages extend upwardly and outwardly. Into the bottom 10 of the shell is screwed the sediment-eduction pipe 12, leading downward from the interior of the shell toward the lower end of the discharge pipe 3. A spider 13 holds the lower end of the air-pipe 7 in place within the discharge pipe.

With the parts assembled and positioned, air is forced through the air-supply pipe 7 into the atomizer 8. Meeting the solid water in the lower part of the atomizer, the air will take the path of least resistance and pass out of the atomizer through the passages 11 in finely divided jets. These finely divided jets are directed outwardly and upwardly into the water between the atomizer and the discharge pipe 3. The column of water adjacent to the conical top of the atomizer becomes thoroughly aerated and through its lessened specific gravity rises in the discharge pipe. This tendency to rise is accelerated by the upward discharge of the air-jets from the passages 11.
As the aerated water rises it is followed by the solid water from beneath, which in turn is also aerated. When the pump is first started the movement of the water upwardly is somewhat sluggish owing to the dead water above the atomizer, but by increasing the pressure of air in the atomizer this dead water gradually becomes enlivened and finally the mixture of air and water passes upwardly through the discharge pipe 3 and escapes through the eduction-pipe 6. After the water has been flowing a short time the discharge becomes turbulent, that is, large bubbles of air escape with the water and the latter comes with irregular pulsations. This indicates that there is an over-supply of air. When this happens the air-pressure is decreased until the water flows in a steady stream without bubbles of large size. This indicates that sufficient air is being supplied to thoroughly aerate the water and no more, so that the water flows primarily from its lessened specific gravity through a high degree of aeration, and not from a propelling pressure of the air. When the pump is discharging a smooth even stream it is operating at an economical pressure of air. Further regulation of the pump can be secured by using eduction-pipes of different sizes. Under some conditions it might be necessary to use a comparatively small eduction-pipe to increase the pressure above the atomizer to insure a more thorough commingling of the air and water; under other conditions this increase of pressure would not be necessary and an eduction-pipe of larger size could be used. However, to obtain the highest efficiency of the pump a thorough commingling of the air and water is necessary so that the water will hold the air without the formation of large bubbles. By employing the atomizer herein described this result can be obtained. By injecting the air into the water in finely divided jets that are projected upwardly and outwardly the adjacent column of water is not only thoroughly aerated, but the upwardly projected jets have a tendency to overcome the inertia of the water and starts the latter on its upward movement in the discharge pipe.

In new wells where much sediment might occur, or in those wells where there is always more or less sediment, should the pumping operation cease sediment might enter the shell of the atomizer through the passages 11. On starting the pump again this sediment might clog the passages should no provision be made to prevent it. In the present invention such sediment would be collected in the hemispherical bottom of the shell, and on starting the air-pressure the sediment would be forced out through the sediment-eduction pipe 12. At the beginning of the pumping operation an excess of air is supplied to clear the atomizer.

While the invention has been described as applied to a pump in which the discharge pipe also forms the casing of the well and where the air-pipe passes down through the discharge pipe, yet it is obvious that it can also be used in pumps where tubing outside of the discharge pipe forms the casing of the well and in which the air-pipe passes through the annular space between the tubing and discharge pipe into the bottom of the latter.

Having thus described our invention, what we claim and desire to secure by Letters-Patent is,

1. In an air-lift pump, a water-discharge pipe open at its lower end, an air-supply pipe leading into the lower part of the water-discharge pipe, and an atomizer in the lower part of the water-discharge pipe communicating with the air-supply pipe, said atomizer comprising a shell with numerous small air-passages leading through its wall in upward and outward directions and said shell having a sediment-eduction opening in its bottom.

2. In an air-lift pump, a water-discharge pipe open at its lower end, an air-supply pipe leading into the lower part of the water-discharge pipe, and an atomizer in the lower part of the water-discharge pipe communicating with the air-supply pipe, said atomizer comprising a shell approximating a globular form having numerous small air-passages leading through its upper wall in upward and outward directions and said shell having a sediment-eduction opening in its bottom.

3. In an air-lift pump, a water-discharge pipe open at its lower end, an air-supply pipe leading into the lower part of the water-discharge pipe, and an atomizer in the lower part of the water-discharge pipe communicating with the air-supply pipe, said atomizer comprising a shell approximating a globular form with a conical top having numerous small air-passages leading upwardly and outwardly through the wall of the conical top and said shell having a sediment-eduction opening in its bottom.

4. In an air-lift pump, a water-discharge pipe open at its lower end, an air-supply pipe leading into the lower part of the water-discharge pipe, an atomizer in the lower part of the water-discharge pipe communicating with the air-supply pipe, said atomizer comprising a shell with numerous small air-passages leading through its wall in upward and outward directions, and a sediment-eduction pipe leading from the bottom of the atomizer.

5. In an air-lift pump, a water-discharge pipe open at its lower end, an air-supply pipe leading into the lower part of the water-discharge pipe, an atomizer in the lower part of the water-discharge pipe communicating with the air-supply pipe, said atomizer comprising a shell approximating a globular form having numerous small air-passages leading upwardly and outwardly through its upper wall, and a sediment-eduction pipe leading from the bottom of the atomizer.

6. In an air-lift pump, a water-discharge pipe open at its lower end, an air-supply pipe leading into the lower part of the water-discharge pipe, an atomizer in the lower part of the water-discharge pipe communicating with the air-supply pipe, said atomizer comprising an approximately globular shell with a conical top and hemispherical bottom having numerous small air passages leading upwardly and outwardly through the wall of the conical top, and a sediment-eduction pipe leading from the lower part of the hemispherical bottom of the shell.

In testimony whereof we hereunto affix our signatures in the presence of two witnesses.

JULIUS H. HOLMGREEN.
WM. H. UNDERWOOD.

Witnesses:
R. L. BRANDT,
JOHN W. LAWSON.